//!US012497943B2

(12) United States Patent
Shrive et al.

(10) Patent No.: US 12,497,943 B2
(45) Date of Patent: Dec. 16, 2025

(54) BRAKE MECHANISM FOR A RADIAL PISTON UNIT

(71) Applicant: Danfoss Power Solutions (Jiangsu) Co., Ltd., Jiangsu (CN)

(72) Inventors: Chris Shrive, Edinburgh (GB); Yanjiang Wan, Zhenjiang (CN); Xiaoyuan Chen, Zhenjiang (CN)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/579,890

(22) PCT Filed: Dec. 16, 2021

(86) PCT No.: PCT/IB2021/022241
§ 371 (c)(1),
(2) Date: Jan. 17, 2024

(87) PCT Pub. No.: WO2023/111621
PCT Pub. Date: Jun. 22, 2023

(65) Prior Publication Data
US 2024/0328381 A1    Oct. 3, 2024

(51) Int. Cl.
*F03C 1/047* (2006.01)
*F03C 1/04* (2006.01)

(52) U.S. Cl.
CPC .......... *F03C 1/0476* (2013.01); *F03C 1/0403* (2013.01)

(58) Field of Classification Search
CPC ........ F04B 1/047; F04B 1/1071; F04B 53/16; F04B 1/107; F04B 53/22; F04B 1/0404;
(Continued)

(56) References Cited

U.S. PATENT DOCUMENTS 3,403,599 A * 10/1968 Guinot .................. F03C 1/2407
91/418
3,511,131 A *  5/1970 Kress .................... F03C 1/0431
91/472
(Continued)

FOREIGN PATENT DOCUMENTS

CN      113123921 A    7/2021
CN      114635824 A    6/2022
(Continued)

OTHER PUBLICATIONS

International Search Report mailed Sep. 13, 2022, in connection with corresponding International Application No. PCT/IB2021/022241; 6 pages.

*Primary Examiner* — Mark A Laurenzi
*Assistant Examiner* — Benjamin Doyle
(74) *Attorney, Agent, or Firm* — McCormick, Paulding & Huber PLLC (57) ABSTRACT

A hydrostatic radial piston unit of the cam-lobe type of construction including a non-rotary, stationary casing. The stationary casing includes a through hole defining a rotational axis of the hydrostatic radial piston unit. A rotary casing is mounted rotary to the non-rotary, stationary casing in an axial overlapping area. A park brake mechanism includes at least two brake discs arranged adjoined in the overlapping area. An end cover closes the non-rotary casing on a rear end side of the hydrostatic radial piston unit facing away from the rotary casing. The end cover pre-tensions a disc spring against a disc-shaped brake piston both located in the rear end portion of the stationary casing to generate an axially oriented spring force. The force can be forwarded by the brake piston to at least one brake pin arranged in an axially oriented bore in the stationary casing, in order to press the brake discs against each other when the brake (Continued)

piston on the face opposite to the disc spring is not forced to move towards the end cover.

17 Claims, 6 Drawing Sheets

(58) Field of Classification Search
CPC .. F04B 1/0452; F03C 1/04; F03C 1/00; F03C 1/0412; F03C 1/045; F03C 1/002; F03C 1/0406; F03C 1/0409; F03C 1/0444; F03C 1/047; F03C 1/0403; F03C 1/0435; F04C 15/0084
USPC .............................. 417/273; 91/491; 180/308
See application file for complete search history.

(56) References Cited

U.S. PATENT DOCUMENTS

| | | | |
|---|---|---|---|
| 3,593,621 A * | 7/1971 | Praddaude | F03C 1/045 91/498 |
| 3,661,057 A * | 5/1972 | Rogov | F03C 1/0409 91/482 |
| 3,808,951 A * | 5/1974 | Martin | F03C 1/045 91/519 |
| 3,827,338 A * | 8/1974 | Oguni | F01B 13/065 91/183 |
| 3,865,207 A * | 2/1975 | Schwab | B60K 17/356 180/21 |
| 4,040,312 A * | 8/1977 | Tappan | F16H 47/04 475/342 |
| 4,171,732 A * | 10/1979 | Pinson | B60K 7/0015 60/458 |
| 4,326,450 A * | 4/1982 | Bacquie | F03C 1/0435 91/487 |
| 4,398,450 A * | 8/1983 | Louhio | F04C 15/0084 91/477 |
| 4,404,896 A * | 9/1983 | Allart | F03C 1/045 91/497 |
| 4,475,870 A * | 10/1984 | Eickmann | F04B 9/10 417/206 |
| 4,540,073 A * | 9/1985 | Rogier | B60K 17/046 74/411.5 |
| 4,700,613 A * | 10/1987 | Tiljander | F03C 1/2415 91/485 |
| 4,724,742 A * | 2/1988 | Bigo | F03C 1/045 91/497 |
| 5,079,994 A * | 1/1992 | Berbuer | F04B 1/1071 91/497 |
| 5,115,890 A | 5/1992 | Noel | |
| 5,439,356 A | 8/1995 | Grahl | |
| 5,836,231 A * | 11/1998 | Leinonen | F03C 1/045 91/519 |
| 6,050,173 A * | 4/2000 | Sakai | F03C 1/045 91/482 |
| 6,186,046 B1 * | 2/2001 | Allart | F04B 53/22 417/273 |
| 6,199,377 B1 * | 3/2001 | Allart | B60T 13/22 92/72 |
| 6,248,037 B1 * | 6/2001 | Forster | F03C 1/045 475/83 |
| 6,347,571 B1 * | 2/2002 | Cunningham | F16D 55/02 91/472 |
| 6,494,126 B1 * | 12/2002 | Leinonen | F03C 1/0441 91/496 |
| 6,543,222 B1 * | 4/2003 | Case | B60T 5/00 60/436 |
| 10,578,084 B2 * | 3/2020 | Desumeur | F03C 1/0472 |
| 10,677,058 B2 * | 6/2020 | Dole | F04B 27/053 |
| 2001/0003948 A1 * | 6/2001 | Uski | F03C 1/0425 91/472 |
| 2003/0167770 A1 * | 9/2003 | Shrive | F03C 1/045 60/721 |
| 2004/0194619 A1 * | 10/2004 | Lampinen | F03C 1/0447 91/491 |
| 2005/0120984 A1 * | 6/2005 | Kuhn | F04B 1/053 123/54.5 |
| 2008/0178732 A1 * | 7/2008 | Ryyppo | F03C 1/045 91/491 |
| 2008/0206073 A1 * | 8/2008 | Caldwell | F03C 1/045 91/472 |
| 2010/0101406 A1 * | 4/2010 | Walker | F04B 1/053 417/273 |
| 2013/0343914 A1 * | 12/2013 | Fenny | F04B 1/0404 417/273 |
| 2015/0128797 A1 * | 5/2015 | Just | F03C 1/0403 92/57 |
| 2017/0138334 A1 * | 5/2017 | Masson | F04B 1/047 |
| 2018/0009312 A1 * | 1/2018 | Albert | F03C 1/0472 |
| 2018/0017117 A1 * | 1/2018 | Engrand | F16D 65/853 |
| 2022/0074434 A1 * | 3/2022 | Ylä-Mononen | F01B 1/062 |

FOREIGN PATENT DOCUMENTS

| | | |
|---|---|---|
| CN | 217926171 U | 11/2022 |
| CN | 116335907 A | 6/2023 |
| JP | H11141450 A | 5/1999 |
| JP | 2001295749 A | 10/2001 |
| WO | 2013160145 A2 | 4/2013 |

* cited by examiner

BRAKE MECHANISM FOR A RADIAL PISTON UNIT

CROSS-REFERENCE TO RELATED APPLICATION

This application is a National Stage application of International Patent Application No. PCT/IB2021/022241, filed on Dec. 16, 2021, which is hereby incorporated by reference in its entirety.

TECHNICAL FIELD

The present innovation relates to hydrostatic radial piston units, more particular to cam lobe or orbital motors or pumps. In detail the present invention relates to a brake mechanism for a hydrostatic radial piston unit of the cam-lobe type of construction.

BACKGROUND

Radial piston units, i.e. radial piston pumps and radial piston motors, are widely used in the art, e.g. for heavy duty applications. For example, radial piston units are used in the field of construction, agricultural or forestry equipment. Radial piston units are characterized in that their working pistons are moving in radial direction with respect to a central longitudinal/rotational axis, when supplied with pressurized hydraulic fluid in case of a radial piston motor. In general, radial piston units are used in hydraulic applications which do not require high rotational speeds but high torque. Radial piston units show the advantage over axial piston units of a reduced axial construction space.

One specific application of radial piston units is propelling of work vehicles, e.g. of track loaders. Often, one radial piston unit is installed at either side of a frame/body of a work vehicle. Therefore, the geometry of the frame and the propel mechanism is influenced significantly by the dimensions of the radial piston units. The position, where the radial piston unit transmits torque to a drive means, is in many applications preset by other components than the radial piston unit that interact with the drive means. However, radial piston units in the known art show a relatively high length in the axial direction and a relatively high diameter. As radial piston units driving work vehicles have to be integrated into the vehicle frame, the frame has to be designed in a manner to be capable of receiving stationary parts, e.g. a stationary casing, of the radial piston unit in order to be able to support the torque generated/applied in operating conditions. It is therefore desirable to reduce the dimensions of the used radial piston units, especially in the axial direction, as much as possible, in order to reduce the adaption in the design of the frame, the radial piston unit is installed to.

If hydrostatic radial piston units are used in propel applications, often park brakes are required to ensure a fail-safe operation of the hydrostatic radial piston units. In this case, the brakes only allow movement of the vehicle, if they are actively released. In an inactive state of the park brake, movement of the hydrostatic radial piston unit and therewith of the vehicle is blocked. In the state of the art, there are different concepts available for providing a park brake mechanism to hydrostatic radial piston units, e.g. a disc brake which is attached to the outside of the casing of a hydrostatic radial piston unit. As an alternative the brake could be arranged inside the casing of a hydrostatic radial piston unit, where it is guarded from dirt or similar negative influences. Disadvantageously, this arrangement significantly increases the axial length of the hydrostatic radial piston unit.

WO 2013/160145 A2 discloses a radial piston engine with a rotary output shaft. In order to reduce the axial length of the radial piston engine, at least sections of a park brake are arranged between a housing and a portion of the output shaft. The output shaft is designed rotary, e.g. for driving a wheel which can be fastened to an output flange at the output shaft.

SUMMARY

It is an objective of the invention to provide a radial piston unit with reduced dimensions, especially with reduced axial length, but also with reduced radial dimensions/diameter. Simultaneously the provided radial piston unit shall comprise a park brake mechanism which is arranged inside the casing of the radial piston unit such that neither the axial nor the radial dimensions of the radial piston unit are increased significantly.

The objective is solved by a hydrostatic radial piston unit according to claim 1. Preferred embodiments are presented in the dependent claims.

A hydrostatic radial piston unit according to the invention comprises a stationary casing. The stationary casing comprises a through hole which defines a longitudinal axis, which is also the rotational axis of the hydrostatic radial piston unit. The stationary casing is provided to be coupled to a frame of the work vehicle, i.e. in the meaning of the present description, the stationary parts of the radial piston unit according to the invention form the rear end area which can be fastened stationary to a frame or support, e.g.

In the present description, the terms "radial" and "axial" refer to directions relative to the longitudinal axis of the stationary shaft. In the scope of this application, "stationary" means non-rotary around the longitudinal axis, when the radial piston unit is installed to a work vehicle, e.g.

A cylindrical, rotary casing is mounted rotary to the non-rotary, stationary casing in an axial overlapping area. In this area, a front end portion of the non-rotary casing and a rear end portion of the rotary casing overlap in the axial direction. In consequence in the overlapping area at least parts of the rotary casing are arranged radially outside or inside of the stationary casing. Thereby the rear end portion of the rotary casing is sealed against the front end portion of the stationary casing, as the rotary casing is capable of rotating relative to the stationary casing around the rotational axis of the radial piston unit. The sealing between the rotary casing and the stationary casing is executed in such a manner that both casings form together a closed fluid-tight cavity. The connection between the rotary casing and the stationary casing allows the rotary casing to rotate relatively to the stationary casing around the rotational axis, i.e. the longitudinal axis.

Substantially, the axial position of the seal between the stationary casing and the rotary casing defines a sealing plane which is orthogonal to the rotary axis. In consequence in a view from the outside, the sealing plane divides the casing of the hydrostatic radial piston unit in a stationary part on one side of the sealing plane (the rear end part) and a rotary part (the front end part) on the other side of the sealing plane.

In a preferred embodiment of the invention, the stationary casing houses a stationary shaft at a rear end portion in a torque-proof manner. This means that neither the stationary shaft nor the stationary casing rotate relative to each other.

The stationary shaft is arranged coaxially with the rotational axis in an internal cavity formed by the stationary casing and the rotary casing. At a front end portion of the stationary shaft protruding from the stationary casing a stationary cylinder block is arranged in torque-proof connection with the stationary shaft. The cylinder block comprises a plurality of cylinder bores which extend radially inward from a circumferential surface of the cylinder block.

The hydrostatic radial piston unit according to the invention further comprises a park brake mechanism comprising at least two brake discs arranged adjoined in the overlapping area, wherein one brake disc is rotationally fixed to the non-rotary casing and the other brake disc is rotationally fixed to the rotary casing, whereby at least one brake disc is movable in the axial direction. If the hydrostatic radial piston unit comprises more than two brake discs the brake discs are rotationally fixed alternately to the stationary casing and the rotary casing, wherein axial movability has to be provided in order that a brake effect can be achieved by (com-) pressing the brake discs together, and to release the brake by lowering the compression force. According to the invention, rotationally fixed parts cannot rotate relative to each other.

The park brake mechanism comprises a blocking position in which the brake discs are pressed against each other and the rotational position of the rotary casing is fixed in relation to the stationary casing. According to a preferred embodiment of the invention, the brake discs can be arranged in the axial overlapping area between the stationary casing and the rotary casing in axial proximity to the sealing plane.

The park brake mechanism can be pre-tensioned towards its blocking position by means of a disc spring providing a pre-tensioning force which acts in the axial direction on a brake piston, and being supported, e.g. by an endcap/end cover fixed to the rear end of the stationary casing. The end cap closes the non-rotary, stationary casing on an end side of the hydrostatic radial piston unit facing away from the rotary casing, i.e. away from the axial overlapping area in which the rotary casing is mounted to the stationary casing.

The axial pre-tensioning force of the disc spring can be transmitted to the brake discs via the brake piston by means of at least one brake pin extending in an axial direction between the brake piston and the brake discs. The at least one brake pin is preferably arranged in an axially oriented bore in the non-rotary, stationary casing on the side of the brake piston opposite to the disc spring. In consequence, the brake piston transfers the pre-tensioning force of the disc spring to the brake pins which press the brake discs against each other.

A person with skills in the relevant art will select the number, shape and arrangement of the brake pins and the corresponding axially oriented bores according to the requirements of the distinct application. E.g., it might be preferable to arrange at least three brake pins equidistantly distributed on a circular arc which comprises the rotational axis as center.

Different options are available for switching the park brake into open/released position. For a first option, the brake pin seals a chamber that is formed, e.g. in the stationary part of the casing at the rear end of the radial piston unit. The chamber can also be formed by multiple parts, e.g. by the shaft, by the stationary casing, the brake pins and by the brake piston.

Hence, the rear end of the brake pins is preferably attached in a fluid tight manner to the brake piston. An additional sealing is provided between the front end of the brake pin and the stationary casing. Therefore, a pressure chamber is formed by the stationary casing in combination with the rear end front face of the stationary shaft, the brake pin guiding holes and the brake piston. If pressurized hydraulic fluid is supplied to this pressure chamber, a force on a releasing surface of the brake piston is generated in order to counteract against the pre-tensioning force of the disc spring and release the brake. Therewith the compressing force of the brake pin is released from the brake discs and the rotary casing is able to rotate relative to the stationary casing. The release pressure, which is required to release the brake, depends on the dimensions of the releasing surface of the brake piston in comparison to pre-tensioning force provided by the disc-spring. The pre-tensioning force of the spring might be adjustable, e.g. by adjusting the relative position of the brake piston to the end cover by an adjustable shoulder or an adjusting screw in the endcap/end cover. Alternatively, the length of the brake pack, i.e. the number of brake disks, may be adjusted too.

Preferably, the rear end of the brake pin which faces in the direction of the brake piston, comprises a higher diameter than the front end of the brake pins. This design of the brake pins ensures that the pins are always in contact with the brake piston, no matter if the brake is blocking the relative rotation of the stationary and the rotary casing or not. In the blocking position or if the hydrostatic radial piston unit is moved towards the blocking position, the brake piston pushes the brake pin against the brake discs which are pressed, e.g. against a shoulder of the stationary casing.

If pressurized hydraulic fluid is supplied to the before mentioned pressure chambers in order to generate a force on the releasing surface of the brake piston, the same pressure is applied to the end surfaces of the brake pin. This pressure generates a force acting on the end surfaces of the brake pins. Due to the higher diameter of the rear end of the brake pins, a higher force will be generated on this side. Therefore, the brake pin is moved in the direction of the brake piston until it is in contact with the brake piston. Then the brake pin remains in contact with brake piston, even if the brake piston moves in the direction to the disc spring, i.e. in direction of the end cap of the stationary casing.

For the second option representing an alternative embodiment of the invention, a pressure chamber is formed inside of the axially oriented bores in which the brake pins are arranged and guided in axial direction. Sealings are provided at the front and at the rear end of the brake pins to close the pressure chamber. Preferably, also in this embodiment, the rear end of the brake pins which faces in the direction of the brake piston, comprises a higher diameter than the front end of the brake pins. If pressure is supplied to the pressure chamber, a higher force will be generated at the rear end of the brake pins due to the higher diameter. Therefore, the brake pin moves in the direction of the rear end of the hydrostatic radial piston unit, i.e. in the direction of the brake piston. If there is a gap between the brake pin and the brake piston, the brake pin will move towards the rear side until it is in contact with the brake pin. Then, the force generated by the pressure in the pressure chamber is transmitted to the brake piston by means of the brake pin. If the generated force is high enough to overcome the pre-tensioning force of the disc-spring, the disc-spring is compressed and the park brake is released.

In one embodiment according to the invention, the non-rotary, stationary casing comprises annular grooves at an inner surface of the through hole, which form first circular conducts together with first grooves at an outer circumferential surface of the non-rotary, stationary shaft. According to the invention, brake pins are used to bridge the axial gap between the brake piston and the brake discs which can be arranged in the axial overlapping area. Preferably, the axially oriented bores with the brake pins are arranged radially outside of the first circular conducts in the stationary casing. This ensures that sufficient space on the outer surface of the shaft for the annular grooves can be provided, and sufficient space on the inner surface of the stationary casing for the first grooves.

A brake design according to the invention allows centrally arranged brake discs to be positioned close to the region where the rotating part of the hydrostatic radial piston unit overlaps with the stationary part. Simultaneously, the hydraulic connections required for providing hydraulic fluid to the pressure chamber of the brake arrangement in order to release the brake, can be arranged in the stationary part of the hydrostatic radial piston unit as well as mechanical parts of the park brake with the exception of the rotary brake discs fixed to the rotating part. The brake pins provide a functional connection between the brake discs in the overlapping area/near the rotating part and the pressure chamber in the stationary part. Therefore, it is not necessary to feed hydraulic fluid with brake release pressure from the stationary part to the rotating part. In consequence, less sealed joints are required and the complexity of assembling and machining of the hydrostatic radial piston unit according to the invention is reduced. Additionally the quantity of potential leakage points is reduced.

The stationary cylinder block at the front end portion of the radial piston unit comprises a plurality of cylinder bores which extend radially inward from a circumferential surface of the cylinder block. A plurality of working pistons can be arranged in a radially movable manner in the cylinder bores, wherein each cylinder bore accommodates one working piston. Each working piston seals a pressure chamber in the cylinder bore which can be supplied via a hydraulic channel with pressurized hydraulic fluid in order to generate a force on the head of the associated working piston which causes the working piston to move radially outwards. Also via the hydraulic channel hydraulic fluid can be drained from the cylinder bore in case the working piston is forced mechanically inwards, e.g. by means of a cam.

The rotary casing comprises an internal cam-lobe surface. When pressurized fluid is supplied to the pressure chambers, the working pistons are urged against the cam-lobe-surface. As the cylinder block is stationary, and supported by the stationary casing via the stationary shaft, the movement of the working pistons radially outwards generates a force on the cam-lobe surface, which causes the rotary casing to rotate relative to the stationary casing.

In order to conduct pressurized fluid to the pressure chambers, according to the invention a rotary distributor is provided comprising a hollow shaft part and a disc-shaped part which are preferably formed integrally with each other but may also be attached to each other, e.g. in a fluid tight manner. The disc-shaped part is in torque proof connection with the rotary casing, i.e. rotary jointly with the rotary casing. In a preferred embodiment the disc-shaped part of the distributor show radial elevations which fit into the lobes of the cam-lobe surface. The rotary distributor further comprises timing holes in the disc-shaped part for supplying and draining via the hydraulic channels hydraulic fluid to and from the cylinder bores in the cylinder block. Additionally, the rotary distributor comprises second internal grooves forming second circular conducts together with second grooves at the outer surface of the non-rotary, stationary shaft. The second grooves at the outer surface of the non-rotary shaft are connected with the first circular conducts by means of internal channels in the shaft. As a person skilled in the relevant art is familiar with the working principle of a radial piston unit, hence, further detailing of the functioning of a radial piston unit at this point is not necessary.

According to the invention, a pair of roller bearings supports the rotary casing against the stationary casing in a rotary manner. According to the invention, the roller bearings are arranged radially outside of the rotary distributor, however axially substantially in the same position as the hollow shaft part of the distributor in the vicinity of the rear end portion of the rotary casing, respectively, in the vicinity of the front end portion of the stationary casing. In other words, the roller bearings enable a relative motion between the rotary casing and the stationary casing and are arranged nearby or close to the sealing plane in order to avoid large tilt moments of both casings. This facilitates sealing of both casings, too.

The roller bearings according to the invention are arranged as a pair and, in one embodiment, preferably next to or in close proximity to each other. Axially arranged substantially in the same position as the hollow shaft part of the rotary distributor means, that the bearings are disposed in the axial area adjacent to the cylinder block side facing towards the stationary casing and surround at least partially the rotary distributor, e.g. in its cylindrical portion. In this area too, the stationary casing and the rotary casing overlap or at least extensions or protrusions of one or both casings overlap each other axially while being arranged coaxially in a manner in which rotary parts, as the rotary casing or the rotary distributor, e.g., can rotate relative to stationary parts, like the stationary casing or the stationary shaft, for instance. The pair of bearings may comprise a different axial length than the distributor. As the bearings are arranged radially (with respect to the longitudinal axis) outside of the hollow shaft part of the distributor and at least partially overlapping in axial direction with the distributor, instead of axially next to it, the axial length of the hydrostatic radial piston unit is reduced. A person with skills in the relevant art will understand that the use of roller bearings is a preferred embodiment only. However it is also covered by the invention to use journal bearings in order to rotationally support the rotary casing against the stationary casing.

According to one preferred embodiment of the invention, the stationary casing of the radial piston unit can comprise a stationary extension extending beyond the sealing plane in axial direction into the volume of the rotary casing, and having a substantially cylindrical shape. The extension accommodates an inner shell of the bearings, for instance. As the pair of bearings is received in a space between the rotary casing and the rotary distributor, the extension provides, for instance, a stationary support for the pair of bearings radially outside of the rotary distributor. Therefore, the extension is disposed in the space radially between the two rotary parts, the rotary distributor and the rotary casing.

In one embodiment according to the invention, the extension could be formed integrally with the stationary casing. However, in another embodiment according to the invention, the extension is provided as an additional part and is attached to the stationary casing. The extension can for example be attached to the stationary casing by means of screwing, welding, bonding, press fitting, heat shrinking, clamping, crimping or plastic deformation. The connection between the stationary casing and the additional extension part has to be a torque-proof connection, such that supporting forces of the bearings can statically be transmitted via the extension to the stationary casing. This separate part design increases the possibilities for designing and assembling the radial piston unit according to the invention. Preferably, the extension comprises a hollow cylindrical, sleeve-like shape wherein its outer surface is adapted to accommodate the pair of bearings, preferably in O-arrangement. To support the bearings in an axial direction the extension might comprise fixation means for the bearings at its outer surface, e.g. a shoulder to support the bearings in axial direction, a groove for receiving a retaining ring and/or a thread on which a shaft nut can be screwed-on.

According to the invention, the pair of roller bearings can not only be positioned in substantially the same axial position or in the proximity of the distributor, but also in substantially the same axial position as a flange, a sprocket or a similar torque transmission device at an outer circumferential surface of the rotary casing. In a motor working mode, a rotary part, like a wheel or a sprocket, can be driven by the hydrostatic radial piston unit. In a pump working mode, a rotary part can drive the hydrostatic radial piston unit. The torque transmission device serves as an interface to which a rotary part, or a track or a chain can be fixed to. As the bearings are arranged basically in the same axial position as the torque transmission device, no or at least reduced tilting moments are generated with respect to the longitudinal axis by the rotary casing relative to the position of the pair of bearings. Therefore, the bearings can be designed smaller and with lower load factors. This leads to lower costs for the bearings and, further, to lower production costs of the hydrostatic radial piston unit. Simultaneously, the bearing arrangement according to the invention decreases the axial length of a radial piston unit and reduces the distance required between the torque transmission point and a fixation means at the stationary casing, via which the radial piston unit can be installed to, e.g., the frame of a vehicle.

In another embodiment according to the invention, the hydrostatic radial piston unit comprises a stationary (non-rotary) two-speed, three-speed or multiple-speed-control valve. The control valve, e.g. in the two speed embodiment, is switchable between a first position and a second position. In the first position, e.g. all cylinder bores are used for generating torque on the rotary casing, i.e. the cylinder bores can be supplied with fluid under a high pressure, e.g. working pressure. This means, that a cylinder bore is supplied with hydraulic fluid under a high pressure forcing the piston which is arranged in the cylinder bore to move radially outwards. When the piston is moving radially inwards because it follows the shape of a cam of the cam-lobe surface, the corresponding cylinder bore is connected to an outlet timing hole and hydraulic fluid is drained from the cylinder bore. In the second position, e.g., only a portion of the cylinder bores shows the same working behavior as in the first position, i.e. only a portion of cylinder bores can be supplied via an inlet timing hole with hydraulic fluid under high pressure. However, another portion of the cylinder bores is supplied with hydraulic fluid at a reduced pressure, e.g. charge pressure, independently from the movement of the working pistons. Here, for instance, groups of cylinder bores can also be hydraulically short-circuited under reduced hydraulic pressure.

In other words, in the first position of the control valve, the working volume of the hydrostatic radial piston unit is the sum of all working volumes enclosed between the cylinder bores and their corresponding working cylinders. In the second position, only a part of the cylinder bores is supplied with fluid at high pressure. Therefore, only this part of the working pistons and the corresponding cylinder bores contribute to the working volume of the radial piston unit. The other working pistons are supplied with a reduced pressure sufficient to assure contact of the piston rollers with the cam-lobe-surface of the rotating casing. They do not contribute to the actual working volume of the radial piston unit as the corresponding pressure chamber is not supplied with hydraulic fluid under high pressure. In the short-circuited case, the hydraulic fluid volume necessary to move one piston outwards is displaced by another inwardly moving piston.

In another preferred embodiment according to the invention, the cam lobe surface is integrally formed with the rotary casing. If the casing would be assembled of multiple parts, the necessary connections and seals would require additional radial and axial space. Integrally forming the rotary casing together with the cam-lobe-surface decreases the complexity of the assembling process. Additionally, this integral concept is capable of reducing the diameter, i.e. the radial dimension, of the hydrostatic radial piston unit, as connections between parts can be eliminated. This also saves manufacturing and assembly costs, as accurately machined connection surfaces and additional assembly steps are avoided.

A synchronizing pin can be accommodated in axially oriented holes in the rotary casing, preferably in prolongation of the lobes, and engaging with a corresponding hole in one of the radial elevations of the disc-shaped part of the distributor. Therewith, the synchronizing pin can simultaneously interact with the rotary casing and the rotary distributor. Thereby the synchronizing pin ensures, that the distributor, or rather the disc-shaped part of the rotary distributor is oriented correctly, when the distributor is installed in the rotary casing. Furthermore, the synchronizing pin synchronizes the rotation of the distributor with the rotation of the rotary casing, i.e. blocks a relative movement between these two parts.

According to the invention, the radial piston unit further can comprise distributor springs to press the rotary distributor with its disc-shaped part towards the cylinder block. According to the invention, these distributor springs are received preferably in axially extending bores in the rotary casing in axial prolongation of the lobes. Preferably the disc-shaped part of the rotary distributor shows a contour complementary to the cam-lobe surface. The distributor springs urge the rotary distributor towards the cylinder block. Thereby a front surface of the disc-shaped part of the rotary distributor and the adjacent front surface of the cylinder block form a hydrostatic bearing between the disc-like portion of the rotary distributor and the stationary cylinder block.

The hydrostatic bearing is supplied with pressurized fluid by means of timing holes which are arranged in the front face of the disc-shaped part of the rotary distributor and via which hydraulic fluid can be supplied/drained to and from the cylinder bores in the cylinder block. Arranging the distributor springs in the rotary casing which is in torque proof connection with the distributor guarantees that there is no relative motion in a circumferential direction between the distributor springs and the distributor. If there would be a relative motion between the two components, the springs would likely be prone to intensive wear and/or would undergo buckling. Additionally, accommodating the distributor springs axially in prolongation/extension of the lobes of the cam-lobe surface reduces load and stress on the synchronizing pin resulting from frictional drag between the rotary distributor and the stationary shaft.

Another benefit is achieved when the springs is housed within the axial thickness of the distributor. This further reduces the axial length of the hydrostatic radial piston motor, as axially oriented bores in the front housing for accommodating the springs are moved to the distributor and therewith the axial length of the front housing can be reduced.

The first cylinder block may comprise more than one row of cylinder bores with radially reciprocating working pistons. Each row of cylinder bores is arranged axially spaced from the adjacent rows. The cylinder bores and the corresponding working pistons can be arranged in circumferential direction adjacent, i.e. with the same rotational orientation, or staggered to each other and can interact with the first cam-lobe surface.

According to the invention, the hydrostatic radial piston unit can comprise further a second cylinder block, whose working pistons interact with the same cam-lobe surface or with another one arranged in parallel to the first one. The second cylinder block is arranged axially parallel to the first cylinder block on the non-rotary shaft. Providing a cylinder block with more than one row of cylinder bores or a second cylinder block increases the potential working volume significantly, wherein the diameter of the hydrostatic radial piston unit stays the same.

In order to tailor the behavior of the hydrostatic radial piston unit to a specific application, the number of cylinder bores and the number of radially reciprocating working pistons of the axially spaced rows of cylinder bores or of the second cylinder block may differ from the number of cylinder bores and the number of radially reciprocating working pistons of the first cylinder block. In this case, a second circumferential cam lobe surface can be provided at the radially inner side of the rotary casing. The working pistons of the second cylinder block or of the second or a further row of cylinder bores can interact with the second cam lobe surface. In one embodiment, the second circumferential cam-lobe surface is formed integrally with the rotary casing.

In a further embodiment according to the invention, a reinforcing disc-shaped cover is attached to a front end of the rotary casing being also the front end of the hydrostatic radial piston unit. The cover closes and preferably seals the rotary casing, e.g. by means of an O-Ring, such that leakage of hydraulic fluid from the inside of the cavity formed by the rotary casing and the stationary casing is prevented. Additionally the front end and the reinforcing cover are designed such that the reinforcing cover is capable of absorbing radially oriented forces acting on the rotary casing due to the cam-lobe working principle.

In another embodiment, the reinforcing cover comprises a sleeve-like collar and the rotary casing comprises a complementary shoulder or vice versa. The sleeve-like collar can be arranged in a form closure connection with the complementary shoulder, at least in the radial direction. Thereby the rotary casing can be reinforced in the radial direction. Preferably, the thickness of the reinforcing cover is designed, such that the reinforcing cover comprises a low rotating mass, as it turns with the rotary casing, but provides a high radial stiffness. The higher radial stiffness of the reinforced rotary casing reduces possible deviations between the cam-lobe-surface and the working pistons interacting with the cam-lobe-surface. The reinforcing cover therefore ensures a better contact between the cam-lobe-surface and the working pistons and thereby prevents increased wear of the components, as it is beneficial for the line contact of the piston rollers being pressed against the cam-lobe surface during operation of the radial piston unit.

In one preferred embodiment according to the invention the hydrostatic radial piston unit is operated as hydraulic motor. The hydraulic motor drives, for instance, a track drive or a wheel of a working machine, e.g. a track loader, by means of the torque transmission device. Especially in the field of track driving it is important, that the axial length of the radial piston unit is low, such that the design of the working machine can be chosen as flexible as possible.

BRIEF DESCRIPTION OF THE DRAWINGS

In the following annexed Figures, exemplary embodiments of the hydrostatic radial piston unit according to the invention as wells as specific subassemblies of a hydrostatic radial piston unit according to the invention are described. The presented embodiments do not limit the scope of the invention. The Figures show.

For illustration and legibility purposes only, in all presented Figures the same functional parts are indicated with same reference numbers.

DETAILED DESCRIPTION

Figure 1:
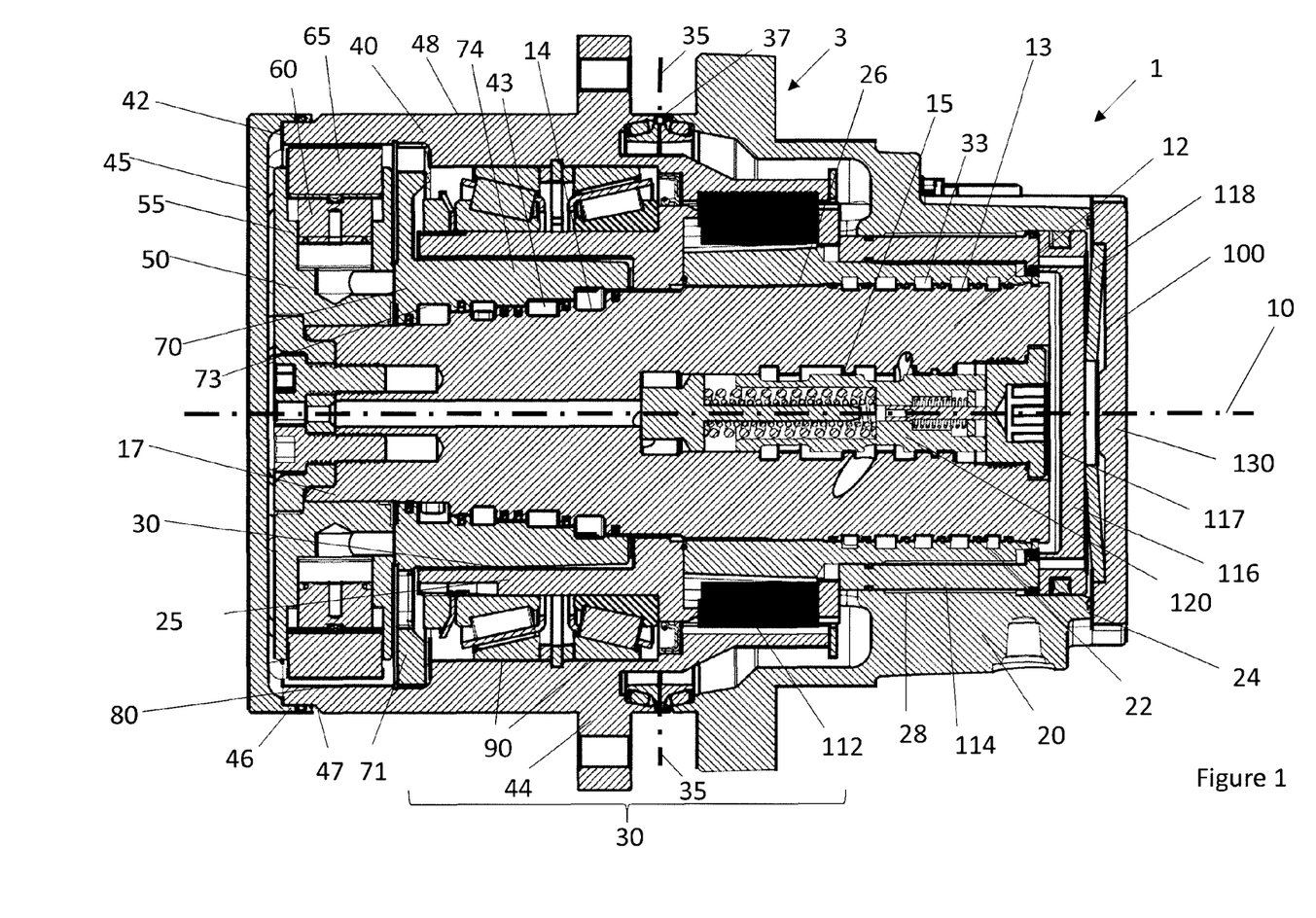
FIG. 1 shows a first sectional view along the rotational axis of a hydrostatic radial piston unit according to the invention.

FIG. 1 discloses a hydrostatic radial piston unit 1 according to the invention. The hydrostatic radial piston unit 1 comprises a stationary, non-rotary casing 20 comprising a through hole 26 which defines a rotational axis 10. The non-rotary casing 20 houses a stationary shaft 12 which is arranged coaxially with the rotational axis 10 and is in torque proof connection with the non-rotary casing 20. A rotary casing 40 is supported by means of a pair of roller bearings 90 such that it is rotatable around the rotational axis 10 in relation to the stationary casing 20. Thereby a rear end portion of the rotary casing 40 is sealed by means of a seal 37 against a front end portion of the stationary casing 20. The axial position of the seal 37 is defined by a sealing plane 35 which is orthogonal to the rotational axis 10. Seen from the outside, the sealing plane 35 splits the housing 3 of the radial piston unit 1 in a rotary casing part 40 on one side of the sealing plane 35 and a stationary casing part 20 on the other side of the sealing plane 35.

The pair of roller bearings 90 is arranged on an extension 25 of the stationary casing 20, wherein the extension 25 according to the embodiment shown in FIG. 1 is provided as an additional extension part. The extension 25 protrudes across the sealing plane 35 into the cavity which is formed by the rotary casing 40. In the embodiment shown with FIG. 1, the roller bearings 90 are arranged as a pair, i.e. substantially directly next to each other in the direction of the rotational axis and in O-configuration. O-configuration of the bearings is preferable, if the support spacing of the bearings shall be increased, e.g. if a component shall be guided with low tilting clearance or if high tilting forces must be supported. Otherwise, an X-configuration or a locating/non-locating bearing arrangement might be chosen.

According to the invention, the pair of bearings 90 are arranged in an axial overlapping area 30, in which the stationary, non-rotary casing part 20 and the rotary casing 40 overlap. In other words: In the overlapping area 30, the stationary casing 20 is arranged coaxially with the rotary casing 40 and vice versa. However, both, the stationary casing 20 and the rotary casing 40, are radially spaced from each other. This means, that the rotary casing 40 surrounds the stationary casing 20, as it is the case in the presented examples, or vice versa.

The rotary casing 40 comprises a torque transmission device 44, i.e. a flange at its outer circumferential surface 48. Depending on the application, a component can be attached to the flange 44, which can be driven by the hydrostatic radial piston unit 1 or which can drive the hydrostatic radial piston unit 1. The torque transmission device 44 is preferably arranged in the same axial position as the pair of bearings 90 in order to reduce the axial lever between the bearings 90 and the torque transmission device 44 and thereby eliminate tilting moments that would otherwise be generated.

Figure 3:
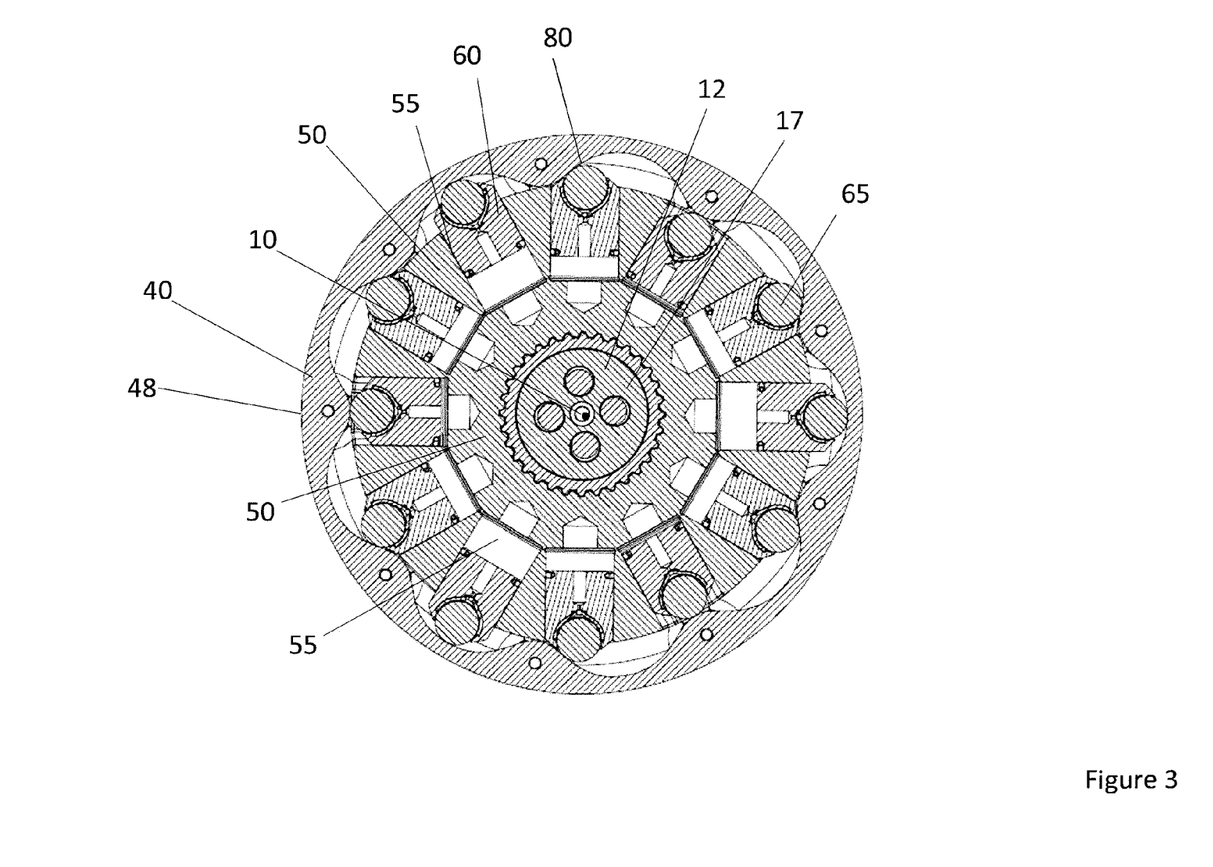
FIG. 3 shows a third sectional view perpendicular to the rotational axis of a hydrostatic radial piston unit according to the invention.

The rotary casing 40 comprises an inwardly oriented cam-lobe surface 80 against which working pistons 60 can be pressed (see also FIG. 3). In the presented embodiment, the cam-lobe surface 80 is formed integrally with the rotary casing 40, e.g. by 3D-milling, casting, turning, forging or a different manufacturing method. The working pistons 60 are housed in cylinder bores 55 of a cylinder block 50. The cylinder block 50 is designed to be stationary with the stationary shaft 12 and the stationary casing 20. Therefore, urging/pressing the working pistons 60 against the cam-lobe surface 80 causes a force on the cam-lobe surface 80 that is supported by the stationary cylinder block 50. Due to the shape of the cam-lobes, this force causes a rotation of the rotary casing 40.

In order to urge the working pistons 60 against the cam-lobe surface 80, pressurized fluid is supplied to the cylinder bores 55 of the cylinder block 50. If, in the opposite case, a working piston 60 is driven radially inwards due to following the shape of the cam-lobe surface, i.e. a cam, hydraulic fluid is drained from the corresponding cylinder bore 55. Therefore, the cylinder bores 55 have to be alternately connected to an inlet of the hydrostatic radial piston unit 1 and to an outlet of the hydrostatic radial piston unit 1. This is accomplished by a rotary distributor 70.

The rotary distributor 70 having a T-shaped cross section with a disc-shaped part 71 and a hollow shaft part 74 is partially arranged in the axial overlapping area 30. In consequence, the pair of bearings 90 can be arranged axially in the same position as the hollow shaft part 74 of the rotary distributor 70 and radially outside of the hollow shaft part 74 of the rotary distributor 70 in the area showing the lower diameter. However, in some designs the pair of bearings 90 might also be arranged radially inside of the hollow shaft part 74 of the rotary distributor 70.

Preferably, the rotary casing 40 and the stationary casing 20 seal an internal cavity. For this, in order to facilitate manufacturing and mounting capability of the parts of the radial piston unit 1 according to the invention, end covers 45, 130 are provided at the rear end side 24 as well as at the front end 42 of the radial piston unit 1. Additionally to its function for closing the casing cavity, the front cover 45 is designed to reinforce the rotary casing 40 and therewith the cam-lobe-surface 80 in the radial direction. The front cover 45 comprises a substantially flat disc-shaped base from which a hollow-cylindrical collar 46 extends. Complementary to the collar 46, a step 47 is provided in the outer circumferential surface 48 of the rotary casing 40. After the front cover 45 is attached to the rotary casing 40, the collar 46 provides support to the step 47 in the radial direction. This additional support guarantees that the cam-lobe surface 80 maintains its shape, even if the working pistons 55 are pressed against the cam-lobe surface 80. The thickness of the collar 46 and of the base plate can be chosen depending on the required stability increase.

Additionally the front cover 45 can comprise a lightweight construction, e.g. by means of reinforcing ribs in the mainly stressed areas and cutouts/recesses in the lower stressed areas. A person with relevant skills in the art will appreciate that the functional principle of a collar 46 providing front cover 45 and a step providing casing 40 might be inverted, such that the front cover 45 can comprise a step 47 and the casing 40 might comprise a collar 46. However, other stability increasing designs which are capable of absorbing forces acting on the rotary casing 40 in the radial direction are also covered by the scope of the invention, e.g. providing a dowelled joint between a substantially flat front cover 45 and the rotary front casing 40.

Additionally to its function for closing the rear end side 24 of the cavity of the two part casing of the radial piston unit 1, the end cover 130 is part of a park brake mechanism 100 whose actuation mechanism is arranged in the stationary casing 20. The park brake mechanism 100 comprises at least two brake discs 112 of which one is attached in a torque proof manner to the rotary casing 40 and the other one is attached non-rotational to the stationary casing 20. The brake discs 112 are movable in the axial direction relative to the stationary casing 20 and the rotary casing 40. If the park brake mechanism 100 comprises more than two brake discs 112, the discs 112 are connected to the stationary casing 20 and the rotary casing 40 in alternating order. A disc spring 118 supported by the end cover 130 provides a pre-tensioning force on a brake piston 116. As long as the brake piston 116 is not pressurized at its releasing surface 117, the spring force is transferred via the brake piston 116 to at least one brake pin 114 arranged in an axially oriented bore 28 in the stationary casing 20.

Preferably, to provide a more balanced actuation of the brake discs, more than one brake pin 114 is provided. The brake pins 114 are each arranged in one of circumferentially distributed axial bores 28. The at least one brake pin 114 applies/transfers the pre-tensioning force of the disc spring 118 on the brake discs 112 which are pressed against each other and supported by a shoulder of the stationary casing 20 or the extension 25, e.g. Therewith relative movement between the rotary casing 40 and the stationary casing 20 can be impeded at standstill of a working vehicle, e.g.

If relative movement between the rotary casing 40 and the stationary casing 20 shall be admitted, hydraulic pressure is applied to a releasing surface 117 of the brake piston 116 located opposite to the disc spring 118. The hydraulic pressure generates a force on the releasing surface 117 which is directed towards the rear side of the stationary casing 20, i.e. in the direction of the disc spring 118. As the generated force is directed opposite to the pre-tensioning force of the disc spring 118, the brake pins 114 are released from the brake discs 112. Thus, relative movement between the brake discs 112 and therewith relative movement of the stationary casing 20 and the rotary casing 40 is possible.

Preferably, the brake pins 114 comprise a specific geometry. The end of the brake pin 114 facing in the direction of the brake piston 116 comprises a higher diameter than the end facing in the direction of the brake discs 112. Additionally, the brake pins 114 are sealed against the stationary casing 20 and the stationary shaft 12. Therefore, a pressure chamber is formed between the end surfaces of the brake pins 114 and the casing 20 of the hydrostatic radial piston unit 1. If the brake piston 116 is urged in the direction of the brake discs 112, it pushes the brake pin 114 against the brake discs 112. If, in the other case, pressure is supplied to the sealed pressure chamber and a force is generated on the end surfaces of the brake pins 114. Due to the different diameters of the end surfaces, the pressure generates a force which urges the brake pin 114 in the direction of the brake piston 116. After the brake pin 114 is in contact with the brake piston 116, it presses the brake piston 116 against the disc spring 118 and thereby releases the axial force from the brake discs 112.

However it is also covered by the concept according to the invention that the specific design of the brake pins 114 ensures that the pins 114 are always in contact with the brake piston 116 independently whether the releasing surface is pressurized or not. In this embodiment, the brake pins 114 are sealed against the stationary casing 20 on the end facing away from the brake pistons 116. The rear end of the brake pins 114 with higher diameter is accommodated in the brake piston 116 and a seal is provided between the rear end of the brake pins 114 and the brake piston 116. Then, when the brake piston 116 is moved by the force generated by hydraulic pressure in a pressure chamber, which is formed by the brake piston 116 together with the shaft 12, the front ends of the brake pins 114 and the stationary casing 20, hydraulic pressure can be present at the rear/end surfaces of the brake pins 114. Due to the higher diameter of the end surface facing towards the brake piston 116, a higher force is generated by the hydraulic pressure on the side facing away from the brake piston 116 and the brake pin 114 is held in contact with the brake piston 116.

Figure 2:
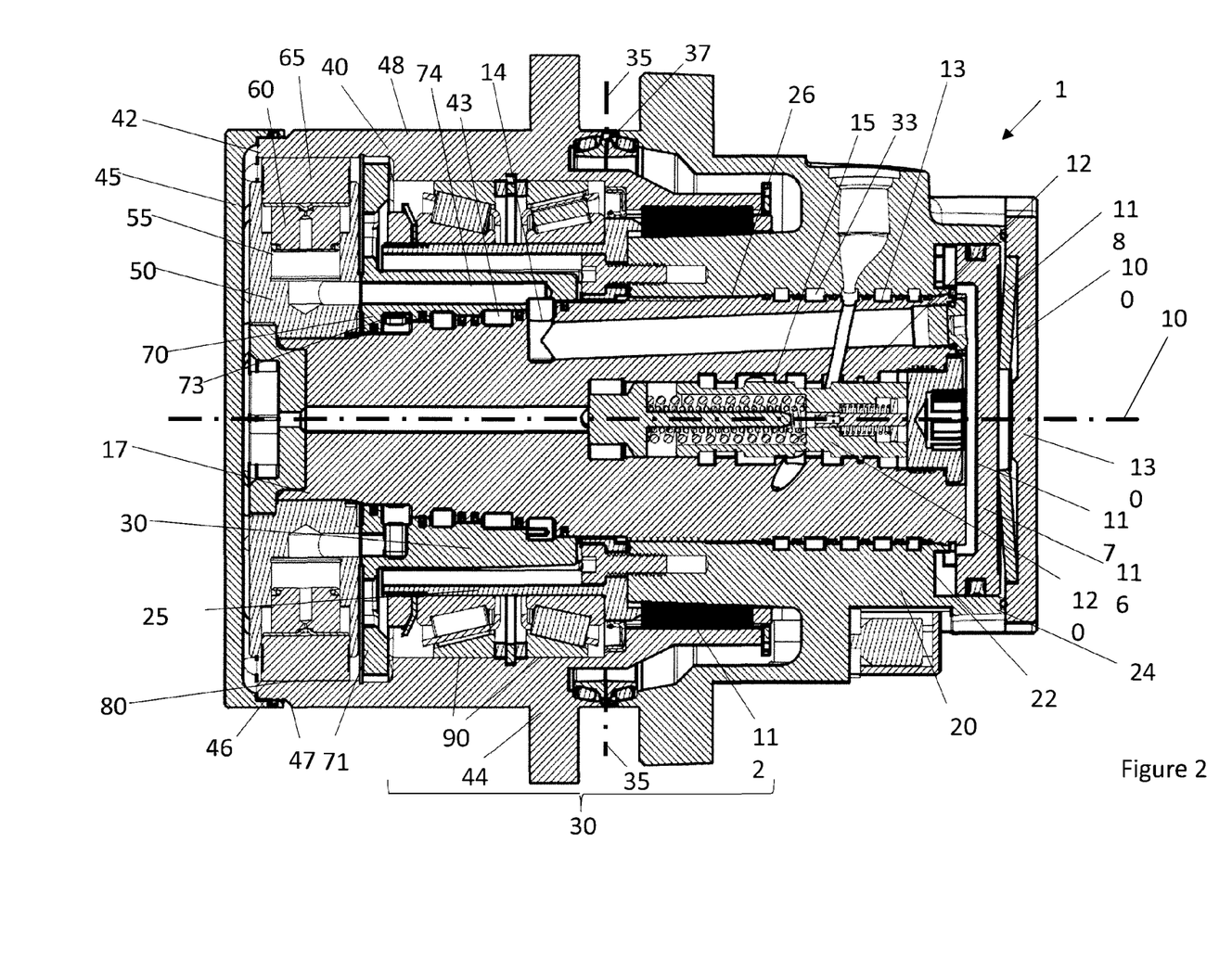
FIG. 2 shows a second sectional view along the rotational axis of a hydrostatic radial piston unit according to the invention.

FIG. 2 shows a sectional view of the hydrostatic radial piston unit 1 according to FIG. 1 in a different section plane. In the view according to FIG. 2, some of the plurality of hydraulic conducts of the hydrostatic radial piston unit 1 according to the invention are shown. In the center of the hydrostatic radial piston unit 1 a stationary, non-rotary shaft 12 is provided comprising first group of grooves 13 in a region towards the end side 24 of the hydrostatic radial piston unit 1 according to the invention. The stationary shaft 12 additionally comprises a second group of grooves 14 in an area towards the front end 42 of the hydrostatic radial piston unit 1. The first group of grooves 13 form first circular conducts 33 together with annular grooves 22 provided in the stationary, non-rotary casing. These first circular conducts 33 are used to distribute hydraulic fluid conducted from the inlet of the hydrostatic radial piston unit 1 and towards the outlet of the hydrostatic radial piston unit 1.

Second circular conducts 43 are formed by the second grooves 14 in combination with second internal grooves 73 in the hollow shaft part 74 of the rotary distributor 70. The first circular conducts 33 are fluidly connected with the second circular conducts 43 by means of channels (not visible in FIG. 2) arranged in the stationary shaft 12.

From the FIGS. 1 and 2, the internal structure of the rotary distributor 70 becomes apparent. The rotary distributor 70 is capable of selectively connecting the second circular conducts 43 with the appropriate cylinder bores 55, depending on whether via the timing holes high pressure shall be supplied to a specific cylinder bore 55 or whether hydraulic fluid shall be drained from the specific cylinder bore 55.

In the shown embodiment of the invention, the extension 25 is provided as additional part which is attached to the stationary casing 20. In addition to supporting the pair of bearings 90, the extension 25 provides a shoulder against which the brake discs 112 can be pressed. Both functionalities require tight manufacturing tolerances in order to guarantee a reliable bearing and braking of the hydrostatic radial piston unit 1. Realizing both of these functionalities on a relatively small additional part comprises the advantage that only the relatively small additional part has to be machined, whereas big parts of the stationary casing 20 do not require such a complicated machining in this regard as it would do, if the stationary casing 20 should provide the shoulder and/or the bearing surface.

The stationary, non-rotary shaft 12 further comprises an axial bore 15 which, in the presented example, is arranged coaxially with the rotational axis 10. A two-speed valve 120 is arranged in the axial bore 15. The two-speed valve 120 comprises two positions. In a first position, all cylinder bores 55 can be supplied with hydraulic fluid at a high pressure. In a second position only a part of the cylinder bores 55 can be supplied with hydraulic fluid at high pressure. The other cylinder bores 55 are supplied with a lower pressure, sufficient to force the rollers of the working piston 60 to follow the cam-lobe surface. Simultaneously the cylinder bores 55 supplied with the lower pressure can be hydraulically short-circuited. Therefore, in the first position, all cylinder bores 55 constitute the working volume of the hydrostatic radial piston unit 1. In the second position, the short-circuited cylinder bores 55 do not contribute to the working volume of the hydrostatic radial piston unit 1, as for every working piston 60 moving to the outside another piston moves to the inside of its associated cylinder bore 55.

In the presented embodiment, the two speed valve 120 is operated hydraulically. However, the two-speed valve 120 might also be operated mechanically or electro-mechanically. In other embodiments, as a person skilled in the relevant art is aware of, the two-speed-valve 120 could be a multiple speed valve 120 providing further positions, to vary the rotational speed and torque of the hydrostatic radial piston unit 1 in a greater range.

FIG. 3 shows a sectional view of the hydrostatic radial piston unit 1 according to the invention in a plane which is arranged orthogonal to the rotational axis 10. The stationary shaft 12 shown in the middle of the FIG. 3 is in torque proof connection with the cylinder block 50. Therefore, the cylinder block 50 is also stationary. The cylinder block 50 comprises radially arranged cylinder bores 55 which are equidistantly distributed on the circumferential surface of the cylinder block 50. Every cylinder bore 55 receives a working piston 60, such that the working piston 60 can slide in the cylinder bore 55 in the radial direction. The working pistons 60 comprise rollers 65 at the radially outward end. The rollers 65 are forced into contact with the cam-lobe surface 80 formed at the radial inside of the rotary casing 40, when pressure is supplied to the cylinder bores 55. The pressure creates a force on the working pistons 60 which is directed radially outwards. If the rotary casing is forced to rotate, the rollers 65 interact with the cam-lobe surface 80 depending on, whether the roller 65 is travelling from a lobe to a cam or vice versa. If the roller 65 travels from a lobe to cam, i.e. the shape of the cam-lobe surface is directed radially inwards, the roller 65 and the corresponding piston 60 are forced in the inward direction by the shape of the cam-lobe surface 80 and hydraulic fluid is drained from the associated cylinder bore 55. In the opposite case, i.e. if the roller travels from a cam to a lobe, which means that the shape of the cam-lobe surface 80 in this zone is directed radially outwards, the roller and the corresponding piston 60 are urged outwardly to follow the cam-lobe surface by the pressure inside the cylinder bore 55.

Figure 4:
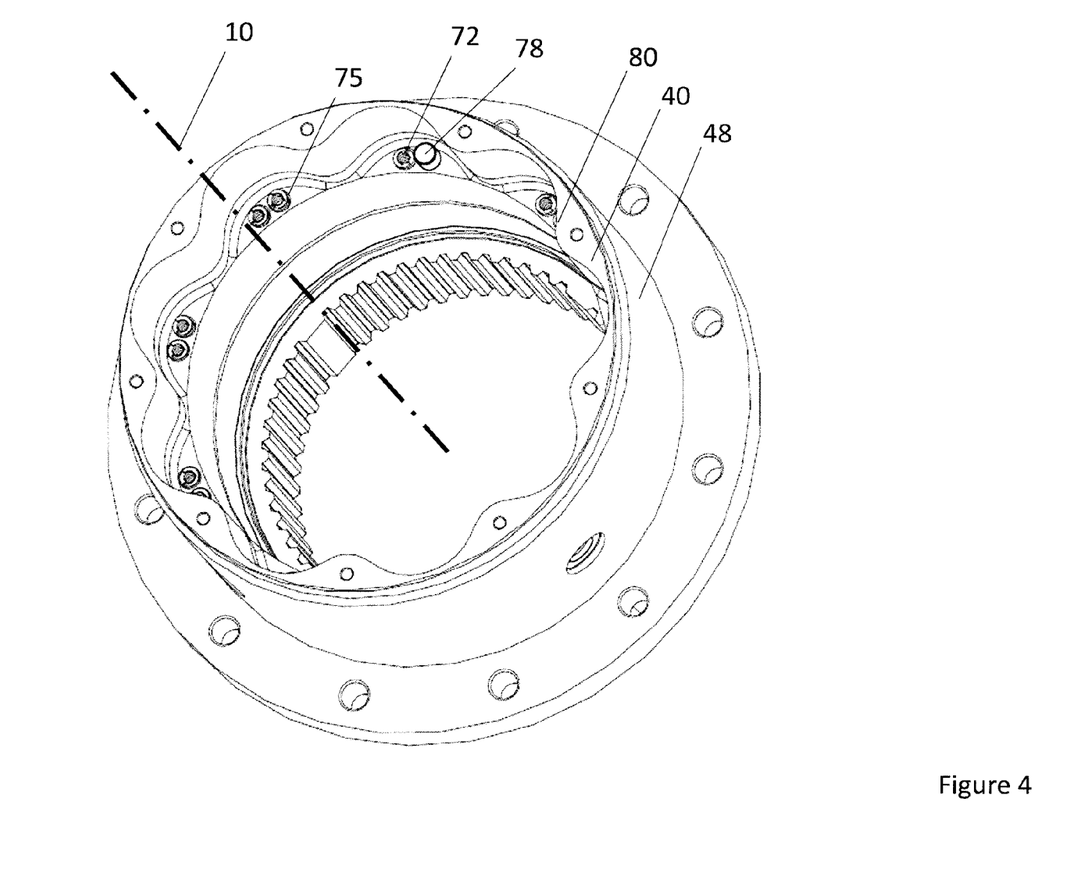
FIG. 4 shows an isometric view of a rotary casing of a hydrostatic radial piston unit according to the invention.

FIG. 4 shows an isometric view of a rotary casing 40 which is used in one embodiment of a hydrostatic radial piston unit 1 according to the invention. Apart from the already above mentioned features, FIG. 4 shows axially oriented holes 75 which are arranged radially inside of the cam-lobe surface 80 at a surface which is perpendicular to the rotational axis 10. The axially oriented holes 75 receive distributor springs 72 that are capable of providing a pre-tensioning force onto an adjacently arranged rotary distributor 70. The disc-shaped part 71 of the rotary distributor 70 and rotary casing 40 in combination with the axially oriented holes 75 and the accommodated distributor springs 72 can be coupled in a rotatable way by means of a synchronizing pin 78 arranged in one of the axially extending holes 75 of the rotary casing 40. In consequence, the rotary distributor 70 and the distributor springs 72 rotate with the same rotational velocity.

A person skilled in the relevant art detect from FIG. 4 in view of FIG. 1 or 2 that the axially oriented holes 75 can be moved to the distributor 70 also, to abut against the bottom surface of the associated lobe. Placing the distributor springs 72 in holes 75 in the distributor 70 fulfills the same function: to press the disc-shaped part 71 of the distributor 70 against the front face of the cylinder block 50.

In FIG. 4 a synchronizing pin 78 is shown also, arranged on a greater diameter as usual in the art. This lowers the shearing moment acting on the synchronizing pin 78. These shearing forces are generated in operation of the hydraulic motor by friction forces between the outer circumferential surfaces of the shaft 12 and inner circumferential surfaces of the distributor 70 sealing with the shaft 12 surfaces to from circular distribution channels (see also FIG. 1 or 2). Here, the synchronizing pin 78 is accommodated in an axial bore 75 in the front housing 40 and a corresponding hole in the distributor 70.

Figure 5:
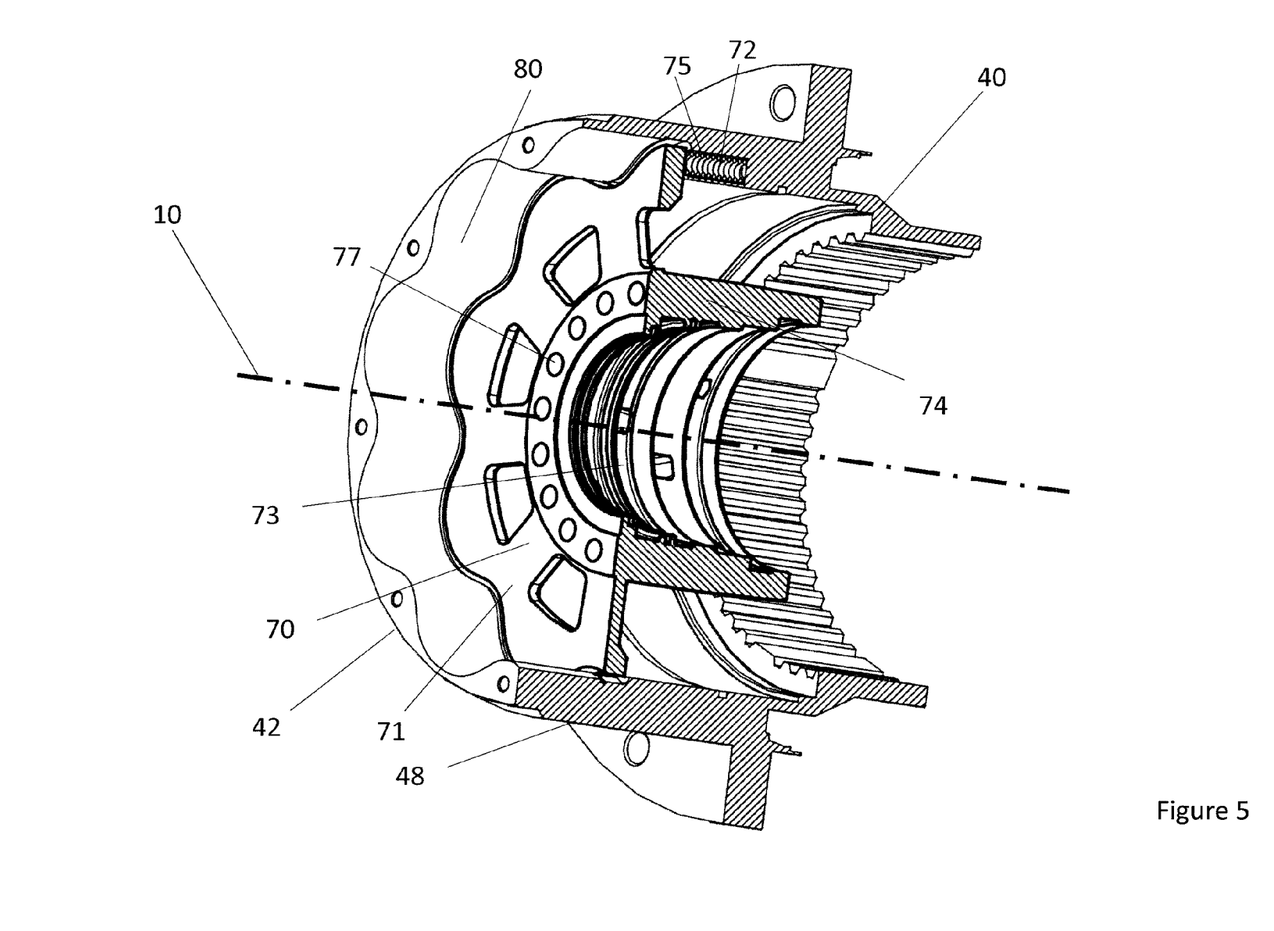
FIG. 5 shows an isometric sectional view of a rotary casing with a mounted distributor of a hydrostatic radial piston unit according to the invention.

FIG. 5 discloses a sectional view of a rotary casing 40, in which a rotary distributor 70 is arranged. The outer surface at the disc-shaped part 71 of the distributor 70 is formed complementary to the cam-lobe surface 80, in order to support the functionality of a synchronizing pin 78 which is accommodated in the rotary casing 40. The synchronizing pin 78 ensures, that the rotational orientation of the distributor 70 is correct, when the distributor 70 is received in the rotary casing 40. Furthermore, the synchronizing pin 78 synchronizes the rotation of the distributor 70 with the rotation of the rotary casing 40. Additionally, it is shown, how the distributor springs 72 abut against the ground of the axially oriented holes 75 and thereby press the distributor 70 in the direction of the front end 42, i.e. towards the cylinder block 50 (not shown in FIG. 5). The rotary distributor 70 comprises a lightweight design, to reduce the rotational inertia of the assembly. For that, clearances are provided at the radially extending plate-like part 71 of the distributor 70 partially. Additionally the second internal grooves 73 which are formed at the radial inside of the distributor 70 are shown. The grooves 73 comprise an annular shape and are capable of guiding fluid to and from timing holes 77 which are arranged in the front face of the distributor 70.

Figure 6:
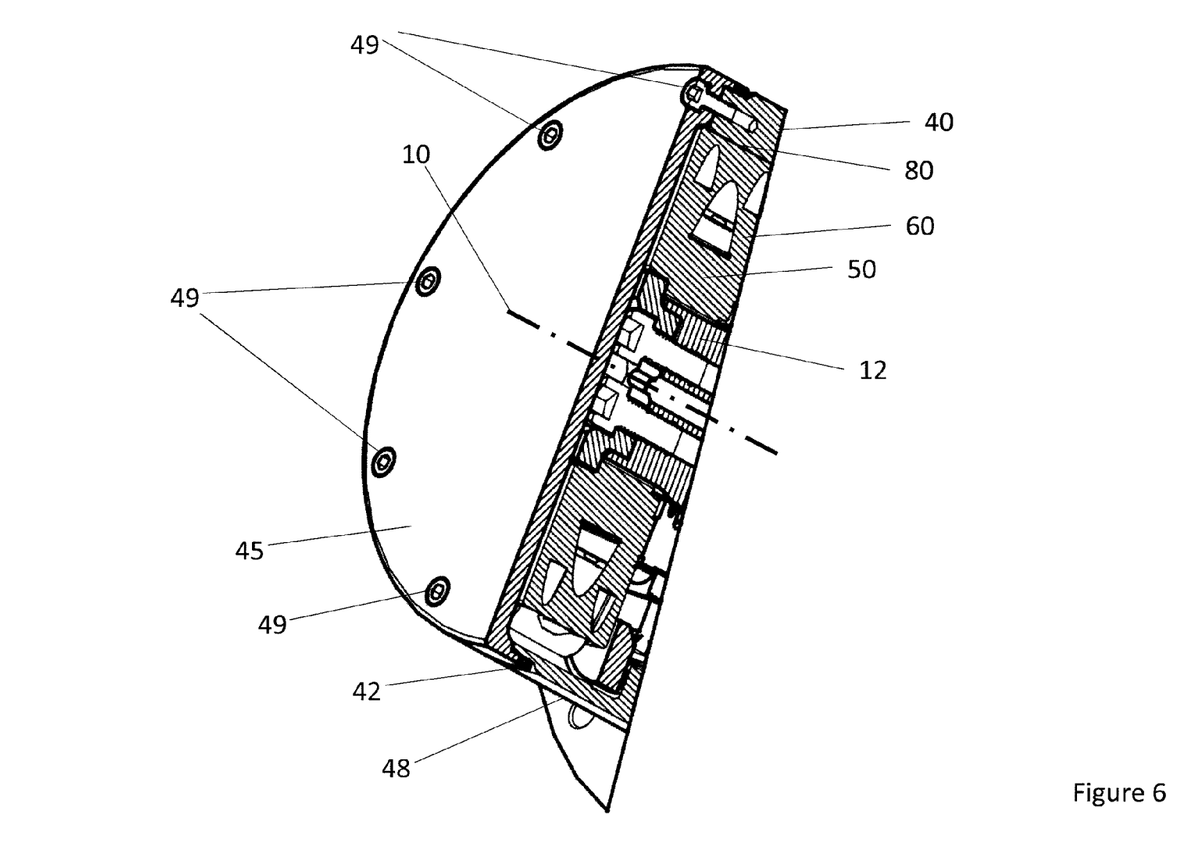
FIG. 6 shows a partial sectional view of the front end of a hydrostatic radial piston unit according to the invention.

FIG. 6 illustrates how the reinforcing front cover 45 is attached to the rotary casing 40 by means of screws which are equidistantly distributed along an imagined circular arc. The above explained combination of a collar in the front cover 45 and a step in the rotary casing 40 not only reinforces the cam-lobe surface 80, but also guarantees that the cover 45 is centered correctly in relation to the rotary casing 40. It will be appreciated that also other techniques to attach the cover to the rotary casing are within the knowledge of a person with relevant skills in the art.

From the above disclosure and accompanying Figures and claims, it will be appreciated that the hydrostatic radial piston unit 1 according to the invention offers many possibilities and advantages over the prior art. It will be appreciated further by a person skilled in the relevant art that further modifications and changes known in the art could be made to radial piston unit 1 according to the invention without parting from the spirit of this invention. Therefore all these modifications and changes are within the scope of the claims and covered by them. It should be further understood that the examples and embodiments described above are for illustrative purposes only and that various modifications, changes or combinations of embodiments in the light thereof, which will be suggested to a person skilled in the relevant art, are included in the spirit and purview of this application.

What is claimed is:

1. A hydrostatic radial piston unit of the cam-lobe type of construction comprising:
    a stationary casing comprising a through hole defining a rotational axis of the hydrostatic radial piston unit;
    a cylindrical, rotary casing mounted rotary to the stationary casing in an axial overlapping area in which a front end portion of the stationary casing and a rear end portion of the rotary casing overlap such that the rotary casing can rotate relatively to the stationary casing around the rotational axis;
    a park brake mechanism comprising at least two brake discs arranged adjoined in the overlapping area, wherein one brake disc of the at least two brake discs is rotationally fixed to the stationary casing and another one of the at least two brake discs is rotationally fixed to the rotary casing;
    an end cover closing the stationary casing on a rear end side of the hydrostatic radial piston unit facing away from the rotary casing, wherein the end cover pre-tensions a disc spring against a disc-shaped brake piston both located in a rear end portion of the stationary casing to generate an axially oriented spring force, wherein
    a stationary shaft is arranged coaxially with the rotational axis in an internal cavity formed by the stationary casing, the rotary casing, the end cover and a front cover, wherein a cylinder block housed non-rotary in the front end portion of the rotary casing is in torque-proof connection with the stationary shaft,
    the rotary casing comprises an internal cam-lobe surface, against which working pistons accommodated in the cylinder block can act;
    the axially oriented spring force can be forwarded by the brake piston to at least one brake pin arranged in an axially oriented bore in the stationary casing, in order to press the at least two brake discs against each other when the brake piston on the face opposite to the disc spring is not forced to move towards the end cover.

2. The hydrostatic radial piston unit according to claim 1, wherein a front end and a rear end of the at least one brake pin seals a pressure chamber in the axially oriented bore which can be pressurized, such that the at least one brake pin is forced in a direction towards the end cover and forces the brake piston to compress the disc spring, therewith releasing the axially oriented spring force from the at least two brake discs.

3. The hydrostatic radial piston unit according to claim 1, wherein the brake piston, the at least one brake pin, the non-rotary shaft and the stationary casing seal a pressure chamber which can be pressurized, such that the brake piston is forced towards the end cover and compresses the disc spring, therewith releasing the axially oriented spring force from the at least two brake discs.

4. The hydrostatic radial piston unit according to claim 1, wherein the at least one brake pin comprises a portion with higher diameter at an end facing towards the brake piston.

5. The hydrostatic radial piston unit according to claim 1, wherein the stationary casing comprises annular grooves at an inner surface which form first circular conducts together with first grooves at the outer surface of the stationary shaft.

6. The hydrostatic radial piston unit according to claim 5, comprising a rotary distributor having a disc-shaped part and a hollow shaft part with which the distributor is arranged around a front end portion of the stationary shaft and received rotationally fixed with the disc-shaped part by the rotary casing, said rotary distributor conducts via timing holes in the disc-shaped part hydraulic fluid to and from working pistons in the cylinder block and comprises inside the hollow shaft part second internal grooves forming second circular conducts together with second grooves at an outer surface of the stationary shaft, which the second circular conducts are connected to the first circular conducts by means of fluid channels located in the stationary shaft.

7. The hydrostatic radial piston unit according to claim 6, comprising a pair of roller bearings for rotationally mounting of the rotary casing to the stationary casing, wherein the pair of roller bearings is arranged in the overlapping area between the rotary casing and the stationary casing radially outside of the hollow shaft part of the rotary distributor.

8. The hydrostatic radial piston unit according to claim 7, wherein the overlapping area in a front end portion of the radial piston unit is defined by an extension of the stationary casing which extends in the axial direction beyond a sealing plane into the volume of the rotary casing and extends radially between the hollow shaft part of the rotary distributor and the rotary casing, wherein the extension is provided to accommodate inner shells of the pair of roller bearings and is provided as an additional part which is attached to the stationary casing or formed integrally with the stationary casing.

9. The hydrostatic radial piston unit according to claim 1, comprising a stationary multiple-speed-control-valve switchable between a first position in which all cylinder bores of the cylinder block can be supplied with hydraulic fluid under high pressure from a high pressure inlet of the hydrostatic radial piston unit and a second position in which only a portion of the cylinder bores can be supplied with fluid under high pressure, and in which pairs of cylinder bores are hydraulically short-circuited.

10. The hydrostatic radial piston unit according to claim 9, wherein the stationary multiple-speed-control-valve is arranged in an axial bore in the stationary shaft, wherein the axial bore is preferably coaxially arranged with the rotational axis, and wherein the multiple-speed-control-valve is a two-speed-control-valve or a three-speed-control-valve.

11. The hydrostatic radial piston unit according to claim 1, wherein the cam-lobe surface is formed integrally with the rotary casing.

12. The hydrostatic radial piston unit according to claim 7, wherein the rotary distributor is biased with an area of the disc-shaped part against a lateral surface of the cylinder block by means of distributor springs and/or distributor pistons both housed axially oriented in the rotary casing or in the area of the disc-shaped part of the rotary distributor, and wherein the distributor springs and/or distributor pistons are received in axially oriented holes in the rotary casing which are arranged in recesses of the cam-lobe surface.

13. The hydrostatic radial piston unit according to claim 1, wherein the first cylinder block comprises more than one row of cylinder bores with cylinder bores and radially reciprocating working pistons which are arranged in a circumferential direction adjacent or staggered to each other and can interact with the cam-lobe surface.

14. The hydrostatic radial piston unit according to claim 13, wherein a second cylinder block, whose working pistons interact with the first the cam-lobe surface is arranged parallel to the first cylinder block on the stationary shaft.

15. The hydrostatic radial piston unit according to claim 14, wherein the numbers of cylinder bores and radially reciprocating working pistons of the second cylinder block differs from the number of cylinder bores and radially reciprocating working pistons of the first cylinder block, and a second circumferential cam lobe surface with which the working pistons of the second cylinder block can interact, is arranged in the front casing on its radial inner side.

16. The hydrostatic radial piston unit according to claim 1, wherein a reinforcing front cover is attached to a front end of the rotary casing facing away of the stationary casing, and closes the rotary casing, wherein the front end of the rotary casing and the reinforcing cover are designed such that the reinforcing cover is capable of at least partially absorbing forces acting on the rotary casing in a radial direction.

17. The hydrostatic radial piston unit according to claim 16, wherein the reinforcing cover comprises a sleeve-like collar and the rotary casing comprises a complementary shoulder or vice versa.

* * * * *